United States Patent
Gombert

(10) Patent No.: US 6,338,602 B1
(45) Date of Patent: Jan. 15, 2002

(54) RETAINING ELEMENT FOR DETACHABLE FASTENING ON A LONGITUDINALLY RIBBED PLASTIC BOLT

(75) Inventor: Stephane Gombert, Grenoble (FR)

(73) Assignee: A Raymond & Cie (FR)

( * ) Notice: Subject to any disclaimer, the term of this patent is extended or adjusted under 35 U.S.C. 154(b) by 0 days.

(21) Appl. No.: 09/614,985

(22) Filed: Jul. 12, 2000

(30) Foreign Application Priority Data

Jul. 14, 1999 (DE) ............................ 199 32 862

(51) Int. Cl.[7] ............................ F16B 21/00; F16B 37/08
(52) U.S. Cl. .................... 411/512; 411/339; 411/433; 411/908
(58) Field of Search ............................... 411/338, 339, 411/433, 437, 512, 908

(56) References Cited

U.S. PATENT DOCUMENTS

| | | | |
|---|---|---|---|
| 3,385,154 A | * 5/1968 | Miklos | 411/339 X |
| 5,302,070 A | * 4/1994 | Kameyama et al. | 411/437 |
| 5,332,347 A | * 7/1994 | Kimisawa | 411/437 X |
| 5,816,762 A | * 10/1998 | Miura et al. | 411/433 |
| 6,155,762 A | * 12/2000 | Courtin | 411/512 |

* cited by examiner

Primary Examiner—Neill Wilson
(74) Attorney, Agent, or Firm—Gifford, Krass, Groh, Sprinkle, Anderson & Citkowski, P.C.

(57) ABSTRACT

The retaining element represented in the figures preferably includes of a receiver cage manufactured of hard elastic plastic, having an inner wall which may bear against a bolt, and a retaining arm formed on the side of the receiver cage opposite the inner wall to be elastically springy. The retaining arm is directed toward the opposite inner wall at an obtuse angle, counter to the press-down direction (A) of the receiver cage on the bolt, with the clearance of the retaining edge from the inner wall being less than the outer diameter of a bolt.

16 Claims, 1 Drawing Sheet

RETAINING ELEMENT FOR DETACHABLE FASTENING ON A LONGITUDINALLY RIBBED PLASTIC BOLT

BACKGROUND OF THE INVENTION

1. Field of the Invention

This invention pertains to a hard elastic plastic retaining element for detachable fastening onto a plastic bolt provided with longitudinal ribs parallel to the bolt axis.

2. Reference to Related Art

A fastening system for fastening on a longitudinally ribbed plastic bolt is known, for example, from EP 0 697 532 B1. In the '532 reference, a cylindrical sleeve, which may be slipped on a bolt, has several sharp-edged inward-projecting blades formed one above the other on every other quarter of the circumference of the inner wall of said cylindrical sleeve. The intermediate regions of the inner wall are smooth. To secure the fastening system, the sleeve must be turned 90° after being slipped onto the bolt. The sharp edges of the blades then dig into the projections of the bolt ribs and provide a secure connection.

On one hand, this fastening system is somewhat expensive to manufacture due to the discontinuous blades and longitudinal ribs. On the other hand, this system is unsatisfactory in terms of assembly cost, since the sleeve must be aligned with the bolt before being slipped on and must be turned so that the blades of the sleeve go down the smooth regions of the bolt. Furthermore, after being slipped on the bolt, the sleeve must again be turned to engage the blades of the sleeve with the longitudinal ribs of the bolt.

SUMMARY OF THE INVENTION

The purpose of the invention is to configure a retaining element that it is easier to manipulate and more economical to manufacture. This problem is solved, according to the invention, by a fastener having a receiver cage featuring an inner wall which may be placed against a ribbed bolt. The fastener also includes a retaining arm formed as a springy part of the receiver cage on the side opposite the inner wall, and projecting diagonally up into the cage interior counter to the direction in which the arm may be depressed to secure the fastener. The free end of the retaining arm is provided with a sharp-cornered retaining edge. The retaining arm is directed toward the opposite wall at an obtuse angle, with the clearance of the retaining edge from the inner wall, when unstressed, being less than the outer diameter of the ribbed bolt.

As the receiver cage is pressed onto a bolt the retain arm initially bends such that the retaining edge may slide downward along the ribs. When the cage comes to rest against the base plate of the bolt, the retaining edge will dig into the ribs according to the restoring force of the retaining arm. The stronger this digging action becomes, the greater the retaining force or tensile force counter to the direction in which the retainer is pressed on the bolt.

In order to prevent a retaining edge from digging into the longitudinal ribs too strongly, a support lug, which rests against the longitudinal ribs, is provided above the retaining edge. The retaining force may be increased further by means of an additional characteristic of the invention whereby at least one sharp-cornered rib, directed into the interior of the cage, is formed on the inner wall bearing against the bolt, transverse to the longitudinal ribs.

In order to release a retaining arm, an unlatching tab is formed on the top of the arm, opposite to the direction the retainer is pressed down. The unlatching tab may be pressed against the wall of the cage, through a corresponding opening in the cage, causing the retaining edge to disengage from the longitudinal ribs and free the cage so that it may be pulled off.

BRIEF DESCRIPTION OF THE DRAWING

An embodiment of the invention is represented in the figures and shall be explained in greater detail in the following.

DETAILED DESCRIPTION

Figure 1:
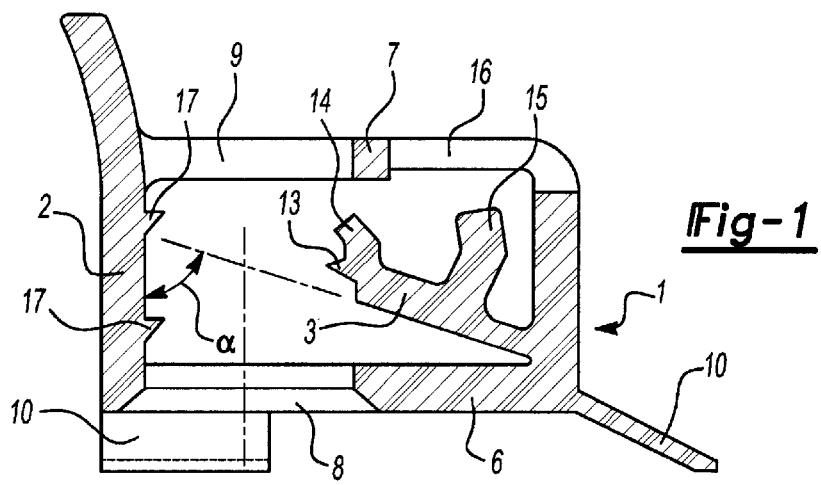
FIG. 1 shows a retaining element in section.

The retaining element represented in the figures preferably includes a receiver cage (1) manufactured of hard elastic plastic, having an inner wall (2) which may bear against a bolt (5), and a retaining arm (3) formed on the side of the receiver cage (1) opposite the inner wall (2) to be elastically springy. The retaining arm (3) is directed toward the opposite inner wall (2) at an obtuse angle (α), counter to the press-down direction (A), with the clearance of the retaining edge (13) from the inner wall (2) being less than the outer diameter of a bolt (5).

A through hole (8,9) is provided in the lower transverse wall (6) and upper transverse wall (7) respectively of cage (1) to permit insertion of a bolt (5) into and though the cage (1). Moreover, springy support wings (10), which project diagonally downward, are formed on three sides of the lower transverse wall (6).

A bolt (5) upon which the retaining element is pressed is likewise made of plastic and is provided with longitudinal ribs (11) parallel to its axis and uniformly distributed over the circumference. The bolt (5) is retained by a base plate (12) upon which rest the support wings (10) of receiver cage (1) after the cage has been pressed on the bolt (5).

The free end of retaining arm (3) is provided with a sharp-cornered retaining edge (13) and has a supporting lug (14) on top. An unlatching tab (15) is located on top of retaining arm (3) and is formed on retaining arm (3) opposite the direction (A) that the retainer is pressed down on the bolt. In order to operate unlatching tab (15) easily with a tool, such as a pair of flat nose pliers, an opening (16) sufficiently large to introduce said pliers is made in the upper transverse wall (7).

To further increase the retaining force, two sharp-cornered ribs (17) projecting into the interior of the cage (4) are formed on the inner wall (2), above and below the height of the retaining edge (13). After a retaining element has been pressed on the bolt (5), the ribs also dig into the longitudinal ribs (11) (FIG. 3).

Figure 2:
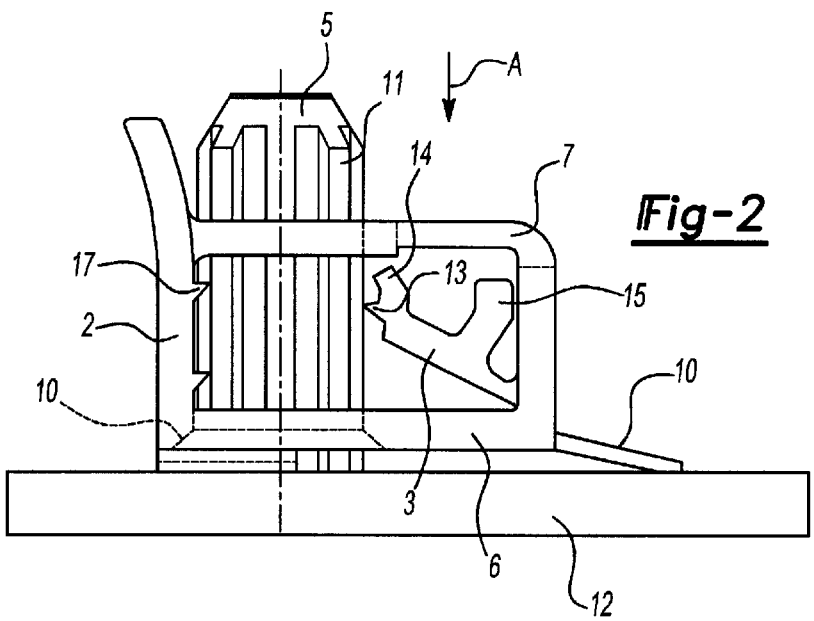
FIG. 2 shows a retaining element in side view as it is pressed down onto a ribbed plastic bolt.
Figure 3:
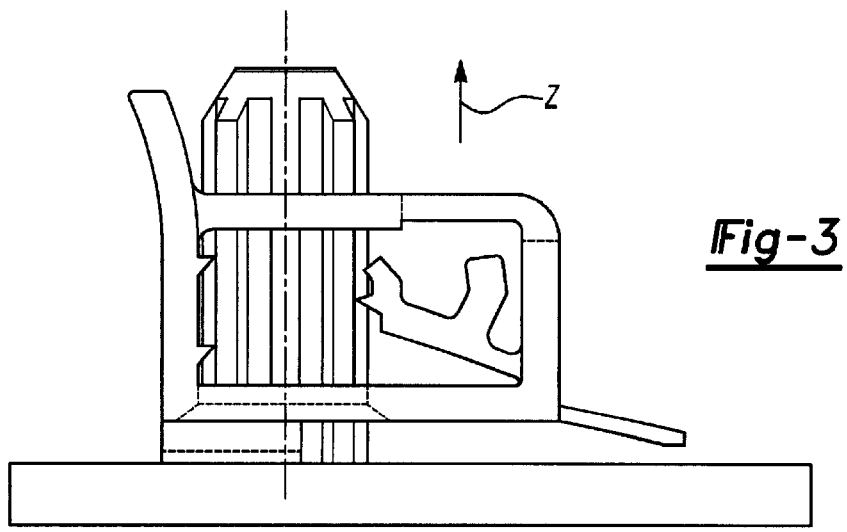
FIG. 3 shows the same fastening situation under the action of tensile force.

The functioning of a retaining element is shown in FIGS. 2 and 3, and shall be briefly explained for better understanding.

When a receiver cage (1) is pressed down in the direction of arrow (A) onto a ribbed bolt (5), the retaining arm (3) is initially bent upward, with the retaining edge (13) sliding downward easily over the longitudinal ribs (11). As seen in FIG. 2, pressing down of the cage (1) on the bolt (5) ceases when the support wings (10) rest against the base plate (11). The support wings are bent back somewhat at this point.

Now the receiver cage (1) rises slightly, from the spring force of the support wings (10), in the direction of the arrow (Z), with the retaining edge (13) digging into the longitudinal ribs (11) until the support lug (14) bears against said ribs (11). The retaining arm (3) now is securely anchored to the bolt (5) and may be detached from the bolt (5) only by bending back the unlatching tab (15).

It should be understood that various changes and modifications to the preferred embodiment will be apparent to those skilled in the art. It is therefore intended that any such changes and modifications coming within the spirit and scope of the invention and without diminishing its attendant advantages be covered by the following claims.

I claim:

1. A hard elastic plastic retaining element for detachable fastening onto a plastic bolt of the type provided with longitudinal ribs parallel to the axis of the bolt, the retaining element comprising:

a receiver cage which can be pressed onto the bolt, the cage having an inner wall which may bear against the bolt, the inner wall having at least one sharp-cornered rib directed into the interior of the cage for bearing against the bolt, the rib being formed on the inner wall transverse to the longitudinal ribs on the bolt; and a springy supporting arm formed on the opposite side of the receiver cage from the inner wall, the arm having a free end which is directed toward the opposing inner wall at an obtuse angle counter to the direction that the receiver cage is pressed down on the bolt, with the free end of the arm being provided with a sharp-cornered retaining edge, the clearance between the retaining edge and the inner wall when the arm is unstressed being less than the outer diameter of the ribbed bolt.

2. A hard elastic plastic retaining element for detachable fastening onto a plastic bolt of the type provided with longitudinal ribs parallel to the axis of the bolt, the retaining element comprising:

a receiver cage which can be pressed onto the bolt, the cage having an inner wall which may bear against the bolt; and a springy supporting arm which is formed on the opposite side of the receiver cage from the inner wall, the arm having a free end which is directed toward the opposing inner wall at an obtuse angle counter to the direction that the receiver cage is pressed down on the bolt, with the free end of the arm being provided with a sharp-cornered retaining edge, the clearance between the retaining edge and the inner wall when the arm is unstressed being less than the outer diameter of the ribbed bolt, the arm further having an unlatching tab formed on the top of a arm counter to the direction that the receiver cage is pressed down.

3. A hard elastic plastic retaining element for detachable fastening onto a plastic bolt of the type provided with longitudinal ribs parallel to the axis of the bolt, the retaining element comprising:

a receiver cage which can be pressed onto the bolt, the cage having an inner wall which may bear against the bolt and a lower transverse wall, the receiver cage further having elastic support wings projecting diagonally downward from at least three sides of the lower transverse wall of the cage; and a springy supporting arm which is formed on the opposite side of the receiver cage from the inner wall, the arm having a free end which is directed toward the opposing inner wall at an obtuse angle counter to the direction that the receiver cage is pressed down on the bolt, with the free end of the arm being provided with a sharp-cornered retaining edge, the clearance between the retaining edge and the inner wall when the arm is unstressed being less than the outer diameter of the ribbed bolt.

4. A retaining element for detachable fastening onto a bolt having longitudinal ribs parallel to the axis, said retaining element comprising:

a receiver cage pressable onto the bolt, said receiver cage having an inner wall for bearing against the bolt and a lower transverse wall with an opening defining one end of a passage for receiving the bolt, said inner wall defining a side of the passage; and a retaining arm formed on the side of said receiver cage opposite said inner wall and extending upwardly counter to the direction that said receiver cage is pressed down onto the bolt, said retaining arm having an attached end spaced from the passage and a free end including a sharp-cornered retaining edge.

5. A retaining element as described in claim 4, wherein said retaining arm further comprises a support lug.

6. A retaining element as described in claim 4, further comprising at least one sharp-cornered rib formed on said inner wall transverse to the longitudinal ribs of the bolt, said cornered rib being directed into the interior of said cage for bearing against the bolt.

7. A retaining element as described in claim 4, further comprising an unlatching tab formed on said retaining arm.

8. A retaining element as described in claim 4, further comprising elastic support wings, said wings being formed on at least three sides of said lower transverse wall of said cage.

9. A retaining element for detachable fastening onto a bolt having longitudinal ribs parallel to the axis, said retaining element comprising:

receiver cage pressable onto the bolt, said receiver cage having a lower transverse wall and an upper transverse wall each having an opening defined therein, the openings defining a passage through said cage, said cage further having a continuous inner wall for bearing against the bolt, said inner wall defining a side of the passage; and a single retaining arm formed on the side of said receiver cage opposite said inner wall and extending upwardly counter to the direction that said receiver cage is pressed down onto the bolt, said retaining arm having an attached end spaced from the passage and a free end including a sharp-cornered retaining edge;

wherein said retaining arm is the only retaining arm in said retaining element.

10. A retaining element as described in claim 9, wherein said retaining arm further comprises a support lug.

11. A retaining element as described in claim 9, comprising at least one sharp-cornered rib formed on said inner wall transverse to the longitudinal ribs of the bolt, said cornered rib being directed into the interior of said cage for bearing against the bolt.

12. A retaining element as described in claim 9, further comprising an unlatching tab formed on said retaining arm.

13. A retaining element as described in claim 9, further comprising elastic support wings, said wings being formed on at least three sides of said lower transverse wall of said cage.

14. A retaining element for detachable fastening onto a bolt having longitudinal ribs parallel to the axis, said retaining element comprising:

receiver cage pressable onto the bolt, said receiver cage having an inner wall for bearing against the bolt with at least one sharp-cornered rib formed on said inner wall transverse to the longitudinal ribs of the bolt, said cornered rib being directed into the interior of said cage for bearing against the bolt;

a retaining arm formed on the side of said receiver cage opposite said inner wall and extending upwardly counter to the direction that said receiver cage is pressed down onto the bolt, said retaining arm having a free end including a sharp-cornered retaining edge.

15. A retaining element for detachable fastening onto a bolt having longitudinal ribs parallel to the axis, said retaining element comprising:

a receiver cage pressable onto the bolt, said receiver cage having an inner wall for bearing against the bolt; and a retaining arm formed on the side of said receiver cage opposite said inner wall for bearing against the bolt; and a retaining arm formed on the side of said receiver cage opposite said inner wall and extending upwardly counter to the direction that said receiver cage is pressed down onto the bolt, said retaining arm having a free end including a sharp-cornered retaining edge and a unlatching tab formed on said retaining arm.

16. A retaining element for detachable fastening onto a bolt having longitudinal ribs parallel to the axis, said retaining element comprising:

a receiver cage pressable onto the bolt, said receiver cage further comprising elastic support wings formed on at least three sides of said lower transverse wall of said cage; and a retaining arm formed on the side of said receiver cage opposite said inner wall and extending upwardly counter to the direction that said receiver cage is pressed down onto the bolt, said retaining arm having a free end including a sharp-cornered retaining edge.

* * * * *

UNITED STATES PATENT AND TRADEMARK OFFICE
CERTIFICATE OF CORRECTION

| | | |
|---|---|---|
| PATENT NO. | : 6,338,602 B1 | Page 1 of 1 |
| APPLICATION NO. | : 09/614985 | |
| DATED | : January 15, 2002 | |
| INVENTOR(S) | : Stephane Gombert | |

It is certified that error appears in the above-identified patent and that said Letters Patent is hereby corrected as shown below:

Column 4, line 35 - Replace "receiver" with -- a receiver--.

Column 4, line 52 - Replace "comprising" with --further comprising--.

Column 4, line 66 - Replace "receiver" with --a receiver--.

Column 5, lines 13- 17 -After "a receiver cage pressable onto the bolt, said receiver cage having an inner wall for bearing against the bolt; and" Delete "a retainging arm formed on the side of said receiver cage opposite said inner wall for bearing against the bolt; and."

Column 6, line 10 -After "a receiver cage pressable onto the bolt, said receiver cage" insert --having an inner wall for bearing against the bolt and a lower tranverse wall, said receiver cage,--

Signed and Sealed this

Tenth Day of July, 2007

JON W. DUDAS
*Director of the United States Patent and Trademark Office*